United States Patent [19]

Zwettler et al.

[11] Patent Number: 5,385,782
[45] Date of Patent: Jan. 31, 1995

[54] PRE-COATED DATA CARTRIDGE BASE PLATE

[75] Inventors: Christopher J. Zwettler, Maplewood, Minn.; Leif O. Erickson, River Falls, Wis.

[73] Assignee: Minnesota Mining and Manufacturing Co., St. Paul, Minn.

[21] Appl. No.: 52,813

[22] Filed: Apr. 23, 1993

Related U.S. Application Data

[63] Continuation of Ser. No. 887,536, May 21, 1992, abandoned.

[51] Int. Cl.6 .................................................. B05D 5/00
[52] U.S. Cl. ...................................... 428/332; 369/272; 427/287; 428/457; 428/472.2; 428/702
[58] Field of Search ..................... 427/287; 369/272; 428/332, 457, 472.2, 702

[56] References Cited

U.S. PATENT DOCUMENTS

| | | | |
|---|---|---|---|
| 3,692,255 | 9/1972 | Von Behren | 242/192 |
| 3,861,619 | 1/1975 | Wolff | 242/188 |
| 4,221,348 | 9/1980 | Moeller | 242/192 |
| 4,466,564 | 8/1984 | Smith et al. | 226/170 |
| 4,561,609 | 12/1985 | Collins et al. | 242/192 |
| 5,204,796 | 4/1993 | Koizumi et al. | 360/132 |

OTHER PUBLICATIONS

"Coil Anodizing Defined–A Technical Guide to Pre-Anodized Aluminum," Continuous Coil Anodizing Association, (1989). (No Month avail).
"Pre Finish Metals Inc., The Inside Story," Pre Finish Metals, Inc., (brochure). (No date Avail).
Coil Anodizers Inc. (brochure). (No date avail).

*Primary Examiner*—Bernard Pianalto
*Attorney, Agent, or Firm*—Gary L. Griswold; Walter N. Kirn; Roger R. Tamte

[57] ABSTRACT

A base plate for use in a data cartridge using pre-coated aluminum. The coating is applied before cutting the aluminum into a base plate shaped article.

7 Claims, 2 Drawing Sheets

PRE-COATED DATA CARTRIDGE BASE PLATE

This is a continuation of application Ser. No. 07/887,536 filed May 21, 1992, abandoned.

FIELD OF THE INVENTION

This invention relates to belt-driven data cartridges, and in particular, to processes for producing base plates used therein.

BACKGROUND OF THE INVENTION

The manufacture of tape data cartridges involves the processing and assembly of precision components which enables magnetic recording tape to be operated in the data cartridge in a manner achieving very high areal recording densities. Such product performance requirements are increasingly rigorous in the areas of speed and capacity. These performance characteristics are determined by various component related features. A particularly important component is the data cartridge base plate. The base plate topography effects the perpendicularity of pins mounted in the base plate. These pins support other components of the data cartridge, which in turn effects the performance of a tape moving in the data cartridge.

The designers and manufacturers of data cartridge base plates have focused on improved flatness and rigidity as primary features in controlling the quality of base plates. Other focus areas involve the methods of forming and blanking the metal used in the manufacture of the base plates. This invention relates to a new and different approach to controlling base plate quality.

SUMMARY OF THE INVENTION

A method of manufacturing a base plate for use in a data cartridge uses coated aluminum which is provided in a piece form. The piece is leveled to form a flat plate, and then blanked to form a data cartridge base plate.

An improved data cartridge base plate is manufactured by coating metal to be used as the base plate prior to cutting the metal to a base plate shaped article.

DETAILED DESCRIPTION OF THE INVENTION

Figure 1:
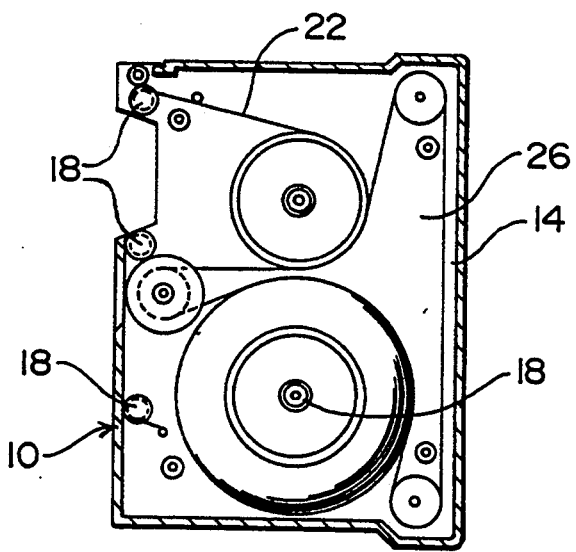
FIG. 1 is a schematic illustration of a belt driven tape cartridge with the cover removed.

A data storage tape cartridge, such as the 5¼" data cartridge 10 shown in FIG. 1, comprises a base plate 14 that is useful for providing support and mounting for various components, including rollers or pins 18 which facilitate the transport of the tape 22. It is critical that pins 18 are perpendicular to base plate 14 to ensure that the tape transport path is precisely parallel with the plane of the base plate. The perpendicularity, or lack thereof, determines the angle of tape 22 relative to a base plate reference surface 26.

Figure 2:
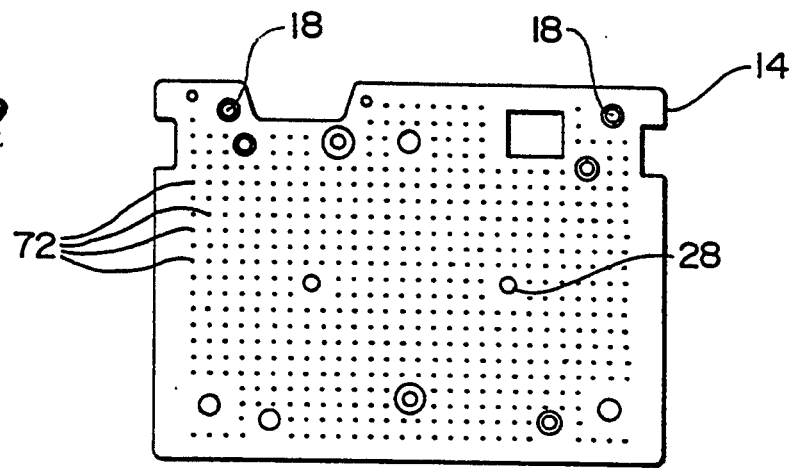
FIG. 2 is a bottom plan view of a base plate for a tape cartridge.

FIG. 2 is a bottom plan schematic illustration of a base plate 14 for a so called mini-data cartridge such as a DC-2000 mini-cartridge used by 3M Company. Preferably the base plate 14 comprises a rigid, flat, metal plate manufactured to impart overall strength to tape cartridge 10 as well as to provide a rigid support platform for tape 22 during use. Each pin 18 shown in FIGS. 1 & 2 must be mounted to base plate 14 to provide the perpendicular orientation discussed above. A common procedure for such mounting is to punch one or more surfaces 28, each of which forms an aperture extending through the base plate 14 in approximate perpendicular relation to reference surface 26. The aperture or hole created by surface 28 has a suitable diameter for insertion of a matched diameter pin or roller. The present invention overcomes various problems associated with prior techniques for manufacturing base plates which result in limits on performance of tape cartridges using those base plates.

Figure 3:
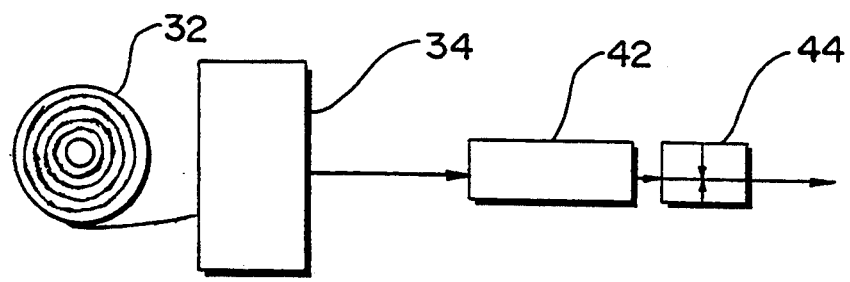
FIG. 3 is a schematic illustration of a prior art process for manufacturing a tape cartridge base plate.

FIG. 3 illustrates, in part, a common prior process of manufacturing base plates similar to base plate 14. In that process, a non-coated supply of base plate metal 32 is provided in roll form to a leveler device 34. Leveler device 34 levels and flattens the metal 32 prior to feeding the metal to die means 42. Die means 42 is used to create a base plate shaped article and to further refine the shape of apertures and boundaries of a base plate prior to anodizing the base plate as represented at anodization means 44.

As the performance demands on tape cartridges become more rigorous, the techniques disclosed in FIG. 3 may no longer be appropriate for producing high quality tape cartridges. In particular, the standard punch and die stamping methods produce a hole which is not uniform throughout the depth of the hole and which is not a uniform diameter from base plate to base plate. These non-uniformities result in the pins being variably secured in the apertures, with an attendant variation in perpendicularity.

Figure 4:
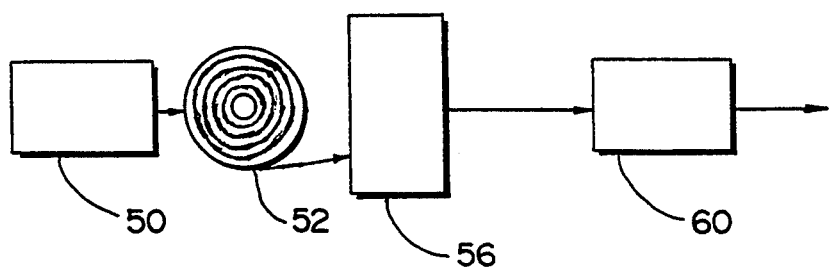
FIG. 4 is a schematic illustration of a process for manufacturing a tape cartridge base plate using a coated metal according to the present inventions.

FIG. 4 illustrates a preferred method for manufacturing base plate 14, or similar base plates, for use with a data tape cartridge 10 according to the present invention. The method of FIG. 4 comprises a process of providing a coated metal for subsequent forming into a base plate. In particular, the coating step 50 provides a coated metal 52, preferably in a roll form after coating. A sheet form of coated metal 52 may also be used and is within the scope of this invention. The coated metal 52 is preferably an anodized metal designed to create a rugged and aesthetically pleasing outer coating for base plate 14. The coated metal 52 is then delivered to a series of processing steps comprising a variety of techniques. One series of processing steps includes providing the coated metal 52 to a leveler device 56 for further leveling of the metal to a thickness suitable for precision manufacturing of the base plate 14. After processing in the leveler device 56, the coated metal 52 passes through die means and several pressing stations represented by numeral 60 which further shape the base plate 14. A stippling process, which may include in-line stippling, is also used to manufacture base plate 14. Shaving and coining operations may also be used to add precise shaping to the base plate 14. The final product has an appearance similar to base plate 14 illustrated in FIG. 2, including the stipple pattern 72, although the precise locations of apertures and edge patterns varies depending on the specific cartridge within which the base plate is to be used.

Figure 5:
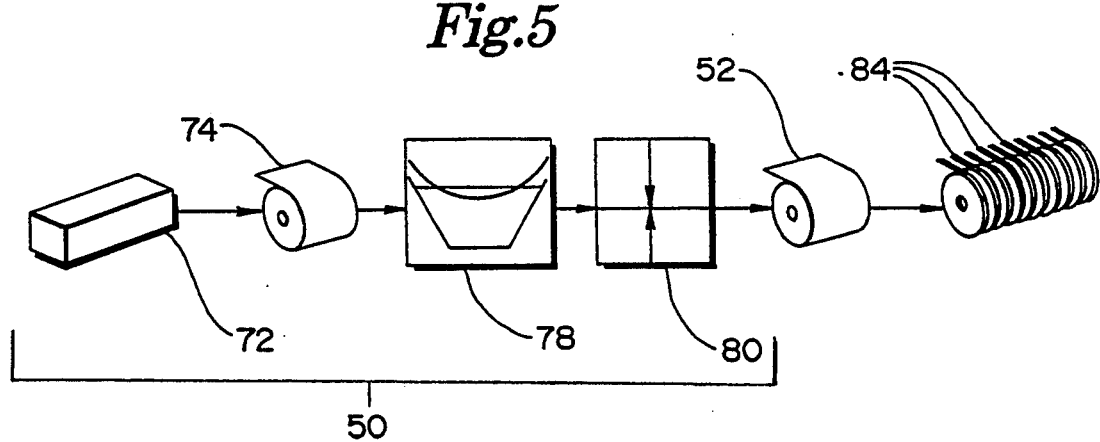
FIG. 5 is a schematic illustration of a process for anodizing metal to be used in the manufacturing process depicted in FIG. 4.

FIG. 5 is a schematic illustration of an anodization process which is one embodiment of the coating step 50 shown in FIG. 4. An aluminum ingot 72 is processed into a roll form 74. This processing typically includes edge scalping, hot roll milling, coiling, preliminary and final thickness rolling, cold rolling, and other sub-steps. Then, a series of steps including anodizing and chemical etching are performed as shown at washing/etching and anodizing stations 78 and 80, respectively. After anodizing, the coated metal 52 is processed using a slitter machine to create a plurality of coated metal strips 84 suitable for feeding to leveler device 56 or other processing equipment.

A particular advantage of the coating process disclosed in FIG. 5 is the improved accuracy of hole size which results in each base plate 14, as the absence of a post-punching coating operation avoids any change in the diameter. The result is a uniform coating thickness on all surfaces of base plate 14, and no coating surface being present on surface 28 after final processing of base plate 14. This uniform diameter permits very precise insertion of a roller or pin 18 into the respective apertures/holes. However, using previous techniques, a hole diameter in a poorly controlled anodizing process could readily vary by as much as 0.002 inch (0.00508 millimeter). Such variation renders impossible the achievement of precision manufacturing and assembly of components requiring excellent perpendicularity and fit. A preferred pin aperture surface forms an aperture with a designated size having a size error tolerance of less than 0.0005 inch (0.0127 millimeter), although error tolerances as low as 0.0001 inch (0.00254 millimeter) have been accomplished using the methods of this invention.

Although FIG. 5 depicts an anodization process, the coating step may alternatively comprise coating or painting an organic material on the metal to be used for the base plate 14. Preferred organic materials include latex, polyester, epoxy, or polyurethane materials which may be applied to the metal using various techniques. Anodizing is currently a preferred method in view of the excellent scratch resistance provided by anodizing, as well as the resistance to skiving that such a coating provides. Also, aluminum is a preferred metal due to cost, weight, and functional thickness characteristics, although other metals may also be used. This invention considerably lowers the reject rate of base plates over the reject rates of base plates anodized after the process in a batch process manner. This reject rate reduction partly relates to the uniformity of coating thickness provided by the more continuous manner of pre-coating the metal prior to base plate formation. In particular, the coating step of this new process comprises providing a coating onto the metal to produce a uniform coating thickness of between 0.0001 inch (0.00254 millimeter) and 0.0002 inch (0.00508 millimeter), with a standard deviation of less than 0.00003 inch (0.00076 millimeter) at a three sigma limit.

Figure 6:
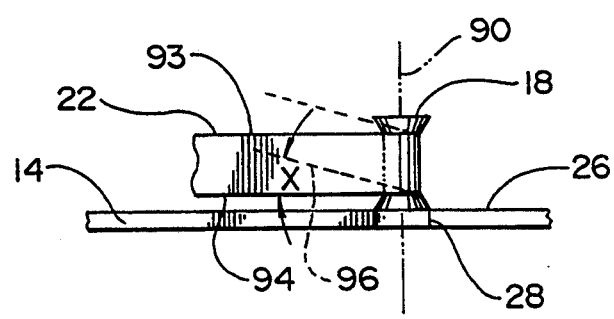
FIG. 6 is an enlarged view of a tape transfer pin mounted on a tape cartridge base plate.

FIG. 6 further illustrates the effect of providing precisely perpendicular orientations for a pin 18 mounted in an aperture created by pin surface 28 within base plate 14. When pin 18 is perpendicular to reference surface 26, tape 22 experiences symmetric tape tension, which is an ideal condition. However, when the vertical axis 90 of pin 18 is configured in a non-perpendicular relation to reference surface 26, tape 22 is likely to be oriented so that side surfaces 93, 94 are not parallel to reference surface 26, as illustrated in dashed lines 96. Angle x represents either a positive or negative angle between tape side edge 96 and reference surface 26 whenever tape 22 is not positioned parallel to reference surface 26. In such case, the geometry of tape cartridge 10 is degraded so that the quality of tape presentation at a tape head is sub-optimum.

In addition to providing improved tolerance and precision in a manufacturing process for a base plate, the pre-coating method also reduces the potentially harmful effects of multiple anodizing sites in a complete manufacturing chain. In other words, localizing the anodizing process to an initial stage of a manufacturing cycle minimizes any possible adverse effects of anodizing processes which might otherwise be located at remote sites.

What is claimed is:

1. An improved data cartridge base plate of the type in which a flat metallic base plate is used for providing component mounting for high quality operation of a data cartridge tape, wherein the base plate comprises a sheet of aluminum having an anodized, insulative coating on both major surfaces, said sheet having been leveled and dimensioned to have a designated width, blanked to have a pin insertion aperture surface defining a plurality of pin insertion apertures extending perpendicularly through the width of the plate, each pin insertion aperture having a substantially uniform size with an error tolerance of less than 0.0005 inch (0.0127 millimeter), and subsequently stippled to relieve stresses built up therein to further improve flatness, said thus formed base plate ensuring that i) during the subsequent manufacture of a data cartridge, no treatment of the base plate need occur between the formation of said apertures and the insertion of pins therein, such that the flatness and allowed precise match between the aperture dimensions and the outside dimension of the pins results in precise perpendicularity of the pins with respect to the plane of the base plate and ii) the resultant base plate has non-coated edge surfaces which may subsequently facilitate ready electrical contact to the base plate, allowing the dissipation of electrostatic charges as may otherwise build up in the cover of a completed data cartridge.

2. An improved data storage tape cartridge comprising a flat metallic base plate and component parts mounted on the plate, including pins that are nominally perpendicular to the plate and which support and facilitate tape transfer within the cartridge; the major surfaces of the plate being covered by a protective coating; the plate containing holes in which said pins are mounted; the surfaces of the plate defining said holes being free of the protective coating at the time the pins are inserted into the holes, whereby the holes, and the pins inserted in the holes, have a precise perpendicularity to the plate.

3. A cartridge of claim 2 in which the exterior edge surface of the plate is also free of the protective coating.

4. A cartridge of claim 2 in which the plate is stippled after the protective coating is applied.

5. A cartridge of claim 2 in which the plate comprises aluminum and the protective coating comprises an anodized coating on the aluminum.

6. An improved data storage tape cartridge comprising a flat aluminum base plate and component parts mounted on the plate, including pins that are nominally perpendicular to the plate and which support and facilitate tape transfer within the cartridge; the major surfaces of the plate being covered by a protective anodized coating; the plate containing holes in which said pins are mounted; the surfaces of the plate defining said holes being free of the protective coating at the time the pins are inserted into the holes, whereby the holes, and the pins inserted in the holes, have a precise perpendicularity to the plate; the exterior edge surface of the plate also being free of the protective coating; and the plate being stippled after the protective coating is applied.

7. A data cartridge base plate made by the steps of:
a) providing a sheet of aluminum having an anodized, insulative coating on both major surfaces;
b) leveling and dimensioning said sheet to form a flat plate having a designated thickness;
c) blanking the flat plate to form a data cartridge base plate having a pin insertion aperture surface defining a plurality of pin insertion apertures extending perpendicularly through the thickness of the plate, each pin insertion aperture having a substantially uniform size with an error tolerance of less than 0.0005 inch (0.0127 millimeter);
d) stippling the thus formed base plate to provide enhanced flatness thereto, the use of a preanodized sheet thereby ensuring that no treatment of the sheet need occur between the formation of said apertures and the insertion of pins therein, such that a precise match between the aperture dimensions and the outside dimension of the pins may be maintained, the step of stippling after dimensioning maximizing the relief of stress, the resultant improved flatness facilitating precise perpendicularity of the pins with respect to the plane of the base plate, and the post anodizing step of leveling and dimensioning results in non-coated edge surfaces of the resultant base plate, thereby facilitating ready electrical contact to the base plate, allowing the dissipation of electrostatic charges as may otherwise buildup in the cover of a completed data cartridge.

* * * * *